United States Patent [19]

Kamiyama et al.

[11] Patent Number: 5,413,377
[45] Date of Patent: May 9, 1995

[54] INFANT-RESTRAINING PROTECTIVE SEAT HAVING INFLATABLE SEAT BELT

[75] Inventors: Misao Kamiyama, Hikone; Yoshinori Ohishi, Ohtsu, both of Japan

[73] Assignee: Takata Corporation, Tokyo, Japan

[21] Appl. No.: 961,820

[22] Filed: Oct. 19, 1992

[30] Foreign Application Priority Data

Oct. 21, 1991 [JP] Japan ............................. 3-272602

[51] Int. Cl.6 .......................................... B60R 21/18
[52] U.S. Cl. ............................. 280/733; 297/467; 297/488
[58] Field of Search ................... 280/730 R, 733; 297/216, 467, 488, 467, 256.15

[56] References Cited

U.S. PATENT DOCUMENTS

| | | | |
|---|---|---|---|
| 3,655,217 | 4/1972 | Johnson | 280/737 |
| 3,897,081 | 7/1975 | Lewis | 280/733 |
| 4,342,483 | 8/1982 | Takada | 280/751 |
| 4,583,253 | 4/1986 | Hall | 5/94 |
| 5,184,844 | 2/1993 | Goor | 280/801 |

FOREIGN PATENT DOCUMENTS

| | | | |
|---|---|---|---|
| 2145050 | 4/1979 | Germany | 280/733 |
| 0258239 | 10/1988 | Japan | 280/733 |
| 1322360 | 7/1973 | United Kingdom . | |
| 1353577 | 5/1974 | United Kingdom . | |
| WO88/07947 | 10/1988 | WIPO . | |

*Primary Examiner*—Margaret A. Focarino
*Assistant Examiner*—Paul N. Dickson
*Attorney, Agent, or Firm*—Armstrong, Westerman, Hattori, McLeland & Naughton

[57] ABSTRACT

Disclosed is an infant-restraining protective seat having an inflatable seat belt, in which an infant seat belt (6) is maintained in the shape of a belt under ordinary conditions. When the a tongue (5) is engaged with a buckle device (4) in order to fasten the belt, gas flow holes (4a) and (5a) are brought into registration to form a single gas flow passageway. Under ordinary conditions, however, the gas flow holes (4a), (5a) are closed by caps (11), (12). Since a gas generator (9) does not operate under ordinary conditions, the protective seat (1) exhibits an infant-restraining function similar to that of the conventional protective seat for infants. At the time of an emergency, the gas generator 9 generates a high-pressure gas that breaks the caps (11), (12) and flows into the infant seat belt (6). As a result, the infant seat belt 6 inflates substantially instantaneously and in reliable fashion. Accordingly, a seated infant is restrained by the inflated seat belt 6 in a reliable manner.

6 Claims, 6 Drawing Sheets

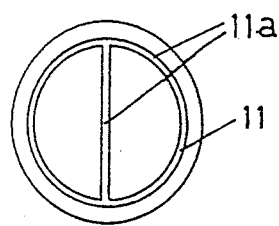
Fig. 5a
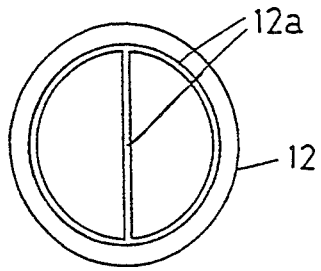
Fig. 5b
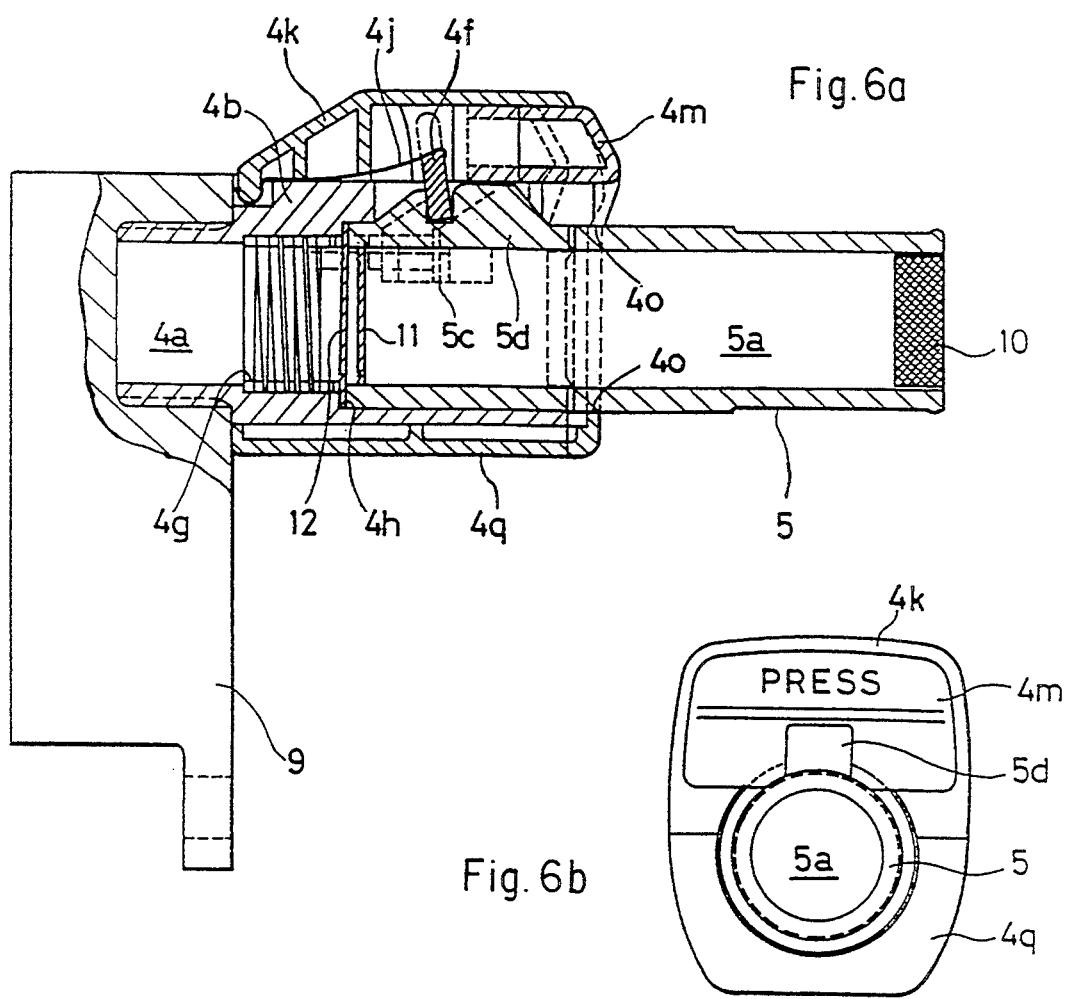
Fig. 6a
Fig. 6b

INFANT-RESTRAINING PROTECTIVE SEAT HAVING INFLATABLE SEAT BELT

BACKGROUND OF THE INVENTION

This invention relates to an infant-restraining protective seat placed on and secured to the seat of a vehicle such as an automobile. More particularly, the invention relates to an infant-restraining protective seat having an inflatable seat belt at least a portion of which is formed into a bag-like shape, wherein the seat belt is maintained in a belt-like form under ordinary conditions and is inflated by gas from gas generating means at the time of an emergency.

In a vehicle such as an automobile, restraining protective seats for infants have been used in order to maintain the seated posture of an infant during travel and protect the infant from shock at the time of acceleration and deceleration. An infant restraining and protective seat of this kind has a reclinable seat main body in which the infant sits. The main body is provided with an infant seat belt for restraining the seated infant, and a chest-contact pad attached to the end of the infant seat belt.

The distal end of the chest-contact pad is provided with a tongue, and the seat main body is provided with a buckle capable of holding the tongue in such a manner that the tongue can be freely engaged with and disengaged from the buckle. In a state in which the tongue is engaged with the buckle, the infant is restrained by the infant seat belt and chest-contact pad.

In a restraining protective seat of this kind, however, the width of the webbing constituting the infant seat belt is not very large, and therefore a comparatively large load acts upon the infant locally when the infant is restrained by the webbing.

In efforts to solve this problem, inflatable seat belt apparatus for automobiles or the like have been proposed, as disclosed in the specifications of Japanese Patent Application Laid-Open (KOKAI) Nos. 47-26830 and 49-88220, in which the webbing is formed into the shape of a bag and functions as an ordinary seat belt by being maintained in a belt-like shape under ordinary circumstances. In the event of an emergency, a gas emitted from gas generating means is introduced into the bag-shaped webbing, thereby inflating the webbing so that the passenger is restrained by the inflated webbing. Thus, the webbing functions as an air belt. In accordance with an inflatable seat belt apparatus of this kind, the webbing receives the kinetic energy of the passenger over a wider area. Since the load is thus dispersed, the load which acts upon the passenger becomes comparatively small and the passenger is protected much more effectively.

It is desired that a protective seat for infants also be provided with an air-belt function by applying the air belt of the inflatable seat belt apparatus disclosed in the above-mentioned publications to an infant seat belt in the above-mentioned protective seat for infants.

Though a protective seat for infants is comparatively small and easy to carry, it is very difficult to directly apply the inflatable seat belt apparatus disclosed in the aforesaid publications to such a protective seat for infants that is capable of being easily carried. For example, it is difficult to reliably supply the gas from the gas generating means to the air belt by means of a simple structure.

SUMMARY OF THE INVENTION

Accordingly, an object of the present invention is to provide an infant-restraining protective seat having an inflatable seat belt in which, in the event of an emergency, gas is reliably supplied to an infant seat belt of a bag-shaped belt through a simple structure, whereby the infant seat belt can be inflated instantaneously.

According to the present invention, the foregoing object is attained by providing an infant-restraining protective seat equipped with an inflatable seat belt and having a seat main body, a infant seat belt provided on the seat main body, a tongue attached to the infant seat belt, and a buckle device, provided on the seat main body, into which the tongue is inserted and locked; gas generating means being attached to the buckle device; at least part of an infant-contact portion of the infant seat belt being formed as a bag-shaped portion; the bag-shaped portion being maintained in a belt-like form under ordinary conditions and inflated by gas from the gas generating means at the time of an emergency; the buckle device having a first gas flow hole communicating with the gas generating means, and the tongue having a second gas flow hole communicating with the interior of the bag-shaped portion, wherein when the tongue is inserted into and locked with the buckle device, the first gas flow hole and the second gas flow hole are communicated to form a gas flow passageway communicating the gas generating means and the bag-shaped portion of the infant seat belt.

The present invention is characterized in that the buckle device is provided with a first cap for shutting the first gas flow hole under ordinary conditions and opening the first gas flow hole by breaking at the time of an emergency, and the tongue is provided with a second cap for shutting the second gas flow hole under ordinary conditions and opening the second gas flow hole by breaking at the time of an emergency.

The present invention is further characterized in that second gas flow hole is provided with a filter for preventing foreign matter from entering the bag-shaped portion of the infant seat belt.

The present invention is further characterized in that the bag-shaped portion of the infant seat belt comprises shoulder belts which come into contact with shoulders of an infant and a chest belt contacted by the chest of the infant, a chest-contact pad being provided for holding the chest belt.

The present invention is further characterized in that the chest-contact belt is provided with retaining portions for retaining the chest belt and grooves which break the retaining portions, wherein the grooves are capable of retaining the chest belt by the retaining portions under ordinary conditions and break under an expansion force produced by the chest belt owing to introduction of the gas at the time of an emergency, whereby the retaining portions separate from the chest belt.

In the infant-restraining protective seat equipped with the inflatable seat belt according to the invention constructed at set forth above, under ordinary conditions the infant seat belt is maintained in the belt-like form and therefore the protective seat exhibits an infant-restraining function similar to that of the conventional infant-restraining protective seat having the seat belt according to the prior art, and the comfort of the conventional infant-restraining protective seat is assured.

When the tongue is inserted into and locked with the buckle device, the first gas flow hole in the buckle and the second gas flow hole in the tongue communicate, thereby forming a gas flow passageway which communicates the gas generating means and the bag-shaped portion of the infant seat belt. In the event of an emergency, the gas generated by the gas generating means flows into the bag-shaped portion of the infant seat belt through the gas flow passageway without being restricted. Accordingly, the infant seat belt is inflated instantaneously and in reliable fashion so that the infant is reliably restrained by the chest belt. Consequently, the portion of the infant seat belt which contacts the infant broadens so that the kinetic energy of the infant is received over a wide area. This means that the load is dispersed so that the infant is protected from large impact loads much more reliably.

Furthermore, according to the invention, the gas flow hole in the buckle and the gas flow hole in the tongue are shut by the respective caps. Therefore, even when the tongue and buckle device are not engaged with each other, foreign matter is reliably prevented from entering the buckle and tongue gas flow holes. In the event of an emergency, the caps are broken instantaneously by the gas so that a gas flow passageway is formed in a reliable manner. This allows the gas to flow into the bag-shaped portion of the webbing in reliable fashion. Accordingly, the bag-shaped portion of the infant seat belt is inflated instantaneously and in a reliable manner.

Furthermore, according to the invention, a filter is disposed in the gas flow hole of the tongue. As a result, any foreign matter such as residue caused by reaction with the gas in the gas generating means or fragments caused by breakage of the caps is captured by the filter. Accordingly, foreign matter will not enter the bag-shaped portion of the infant seat belt and therefore the infant seat belt is protected from the influence of such foreign matter.

Furthermore, according to the invention, the infant is restrained by the chest pad of comparatively large area under ordinary conditions and at the time of deceleration not large enough to actuate the gas generating means. As a result, protection of the infant is made even more reliable in manner similar to that of the conventional infant-restraining protective seat.

Furthermore, according to the invention, the chest belt attempts to expand owing to the gas generated by the gas generated means. Since the chest-contact pad breaks from the groove owing to the expansion force of the chest belt, the chest belt and/or shoulder belt expands much more quickly and reliably.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 5(a) is a diagram showing caps for closing gas flow passageways of a tongue and a buckle device according to this embodiment;

FIG. 5(b) is a diagram showing caps for closing gas flow holes of a tongue and a buckle device according to this embodiment;

FIG. 6 illustrates a tongue and a buckle device in a connected state, in which (a) is a front view a portion of which is shown in section, and (b) a side view;

DESCRIPTION OF THE PREFERRED EMBODIMENTS

Figure 1:
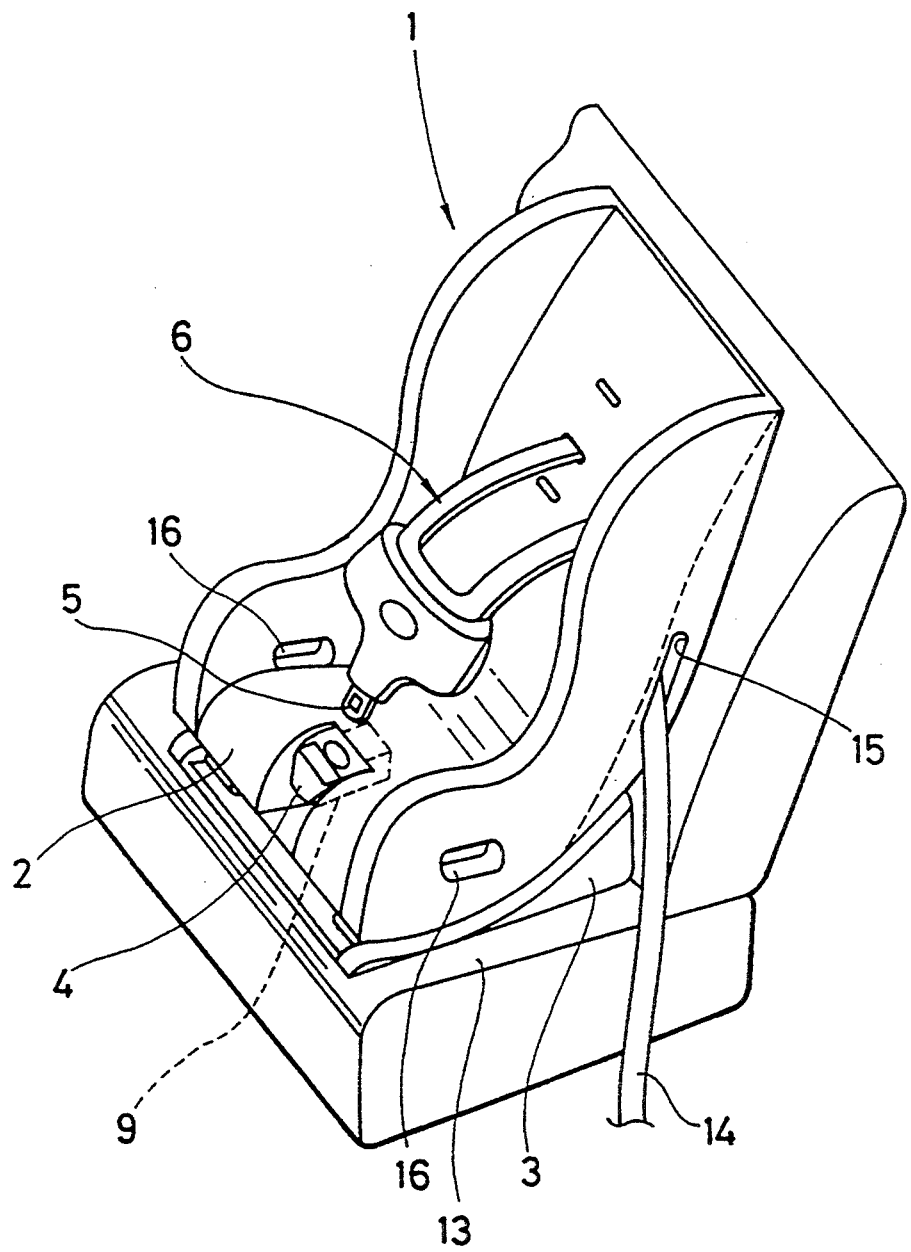
FIG. 1 is a perspective view showing an embodiment of a child-restraining protective seat having an inflatable seat belt according to the present invention.

As shown in FIG. 1, an infant-restraining protective seat having an inflatable seat belt apparatus 1 according to this embodiment includes a seat main body 2 for seating an infant and a base 3 for supporting the infant in a reclinable manner.

Figure 2:
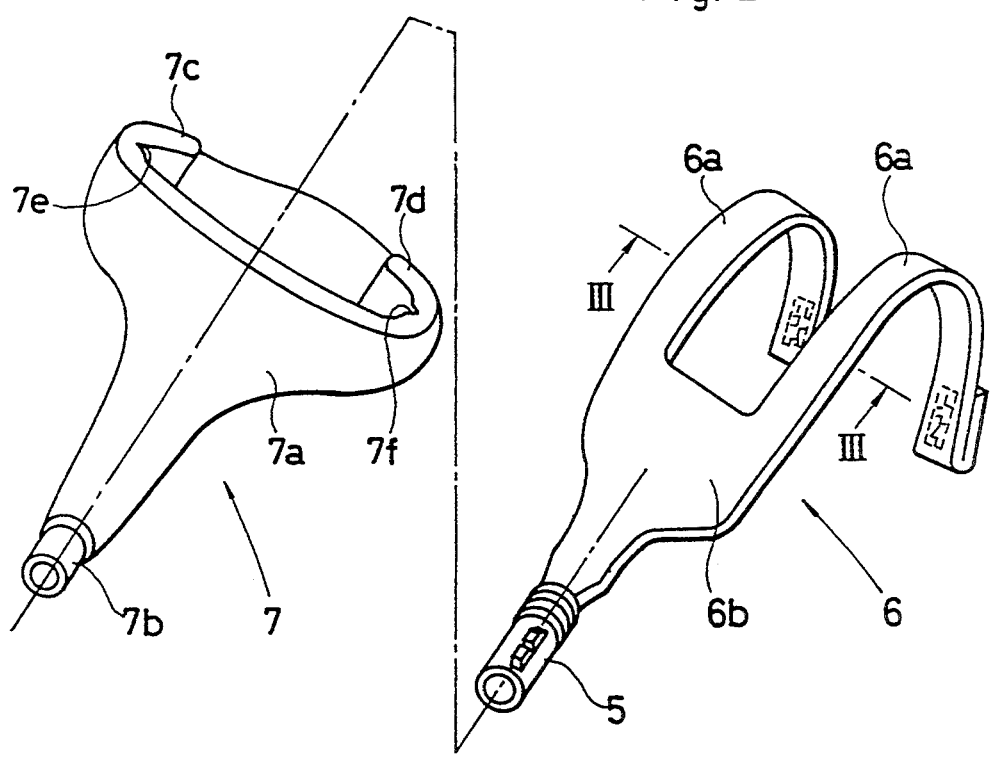
FIG. 2 is an exploded perspective view showing an infant seat belt, which is formed into a bag-like shape, and a chest-contact pad according to the present invention.

The seat main body 2 is provided with an infant seat belt 6 for restraining the infant, and a chest-contact pad 7 attached to a distal end of the infant seat belt 6. As shown in FIG. 2, the infant seat belt 6 comprises a pair of shoulder belts 6a constituting a portion which corresponds to the shoulders of the infant, and a chest belt 6b formed at the distal ends of the shoulder belts 6a and constituting a portion contacted by the chest of the infant. The shoulder belts 6a and chest belt 6b are formed into a bag-like shape.

Figure 3:
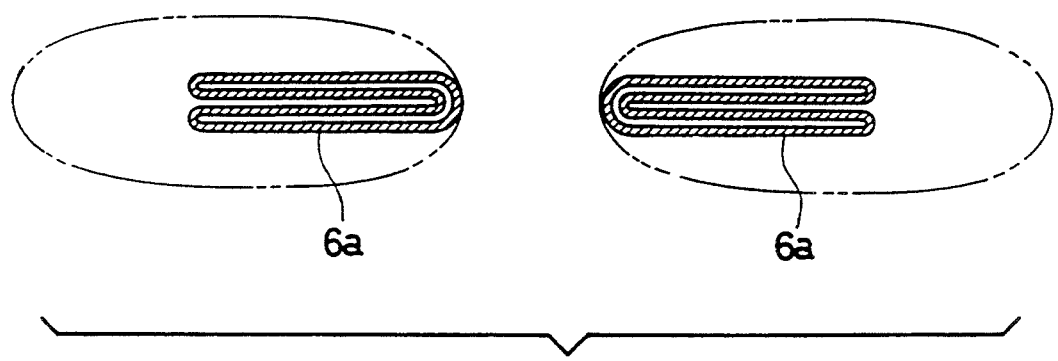
FIG. 3 is a sectional view taken along line III—III in FIG. 2 for describing a method of folding the infant seat belt as well as the behavior of the infant seat belt.

As illustrated by the solid line in FIG. 3, the shoulder belts 6a and chest belt 6b are each folded inward from the outer side of the infant. Furthermore, the folded portions of the shoulder belts 6a and chest belt 6b are lightly bonded as by a bonding agent. Under ordinary conditions, therefore, these belts are maintained in the form of flat belts. When a reaction gas is introduced to the shoulder belts 6a and chest belt 6b from a gas generator 9, the bonded portions readily separate under the expansion force of the shoulder belts 6a and chest belt 6b so that the shoulder belts 6a and chest belt 6b are capable of readily and reliably inflating in the outward direction, as indicated by the two-dot chain lines (shown only for the shoulder belts 6a). In other words, the shoulder belts 6a and chest belt 6b constitute an inflatable seat belt. As for maintaining the shapes of the shoulder belts 6a and chest belt 6b, this can be accomplished by covering the belts with covers or by using any other appropriate method. A tongue is connected to the distal end of the chest belt 6b.

The chest-contact pad 7 comprises a chest-contact portion 7a of a comparatively large area, and a cylindrical portion 7b formed at the distal end of the chest-contact portion 7a. The tongue 5 is passed through the cylindrical portion 7b of the chest-contact pad 7 so as to protrude from the cylindrical portion 7b, and the chest belt 6b of the infant seat belt 6 is held in the chest-contact portion 7a by retaining portions 7c, 7d, thereby attaching the chest-contact pad 7 to the infant seat belt 6. Furthermore, the retaining portions 7c, 7d are formed to have grooves 7e, 7f. The arrangement is such that when gas is fed into the seat chest belt 6b, the chest-contact portion 7a breaks from the grooves 7e, 7f under the expansion force of the chest belt 6b. Owing to breakage of the chest-contact portion 7a, the chest belt 6b inflates instantaneously and in reliable fashion.

The seat main body 2 is provided with a buckle device 4 capable of holding the tongue 5 in such a manner that the tongue can be freely engaged and disengaged. A gas generator (G.G.) is connected to the buckle device 4 for generating high-pressure gas when actuated in the event of an emergency such as a vehicular collision.

Figure 4:
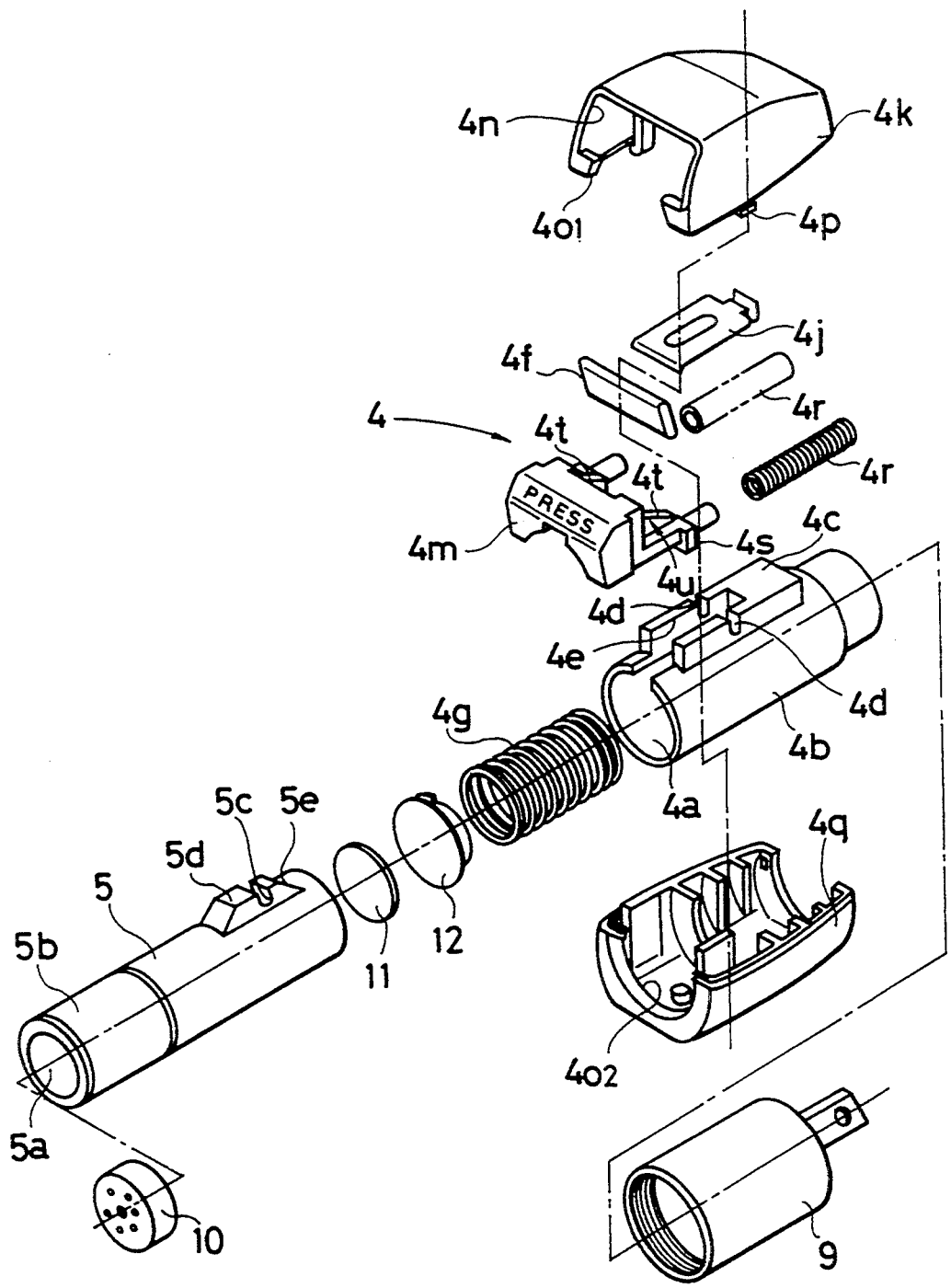
FIG. 4 is an exploded perspective view of a tongue and a buckle device according to this embodiment.

As illustrated in FIG. 4, the tongue 5 is cylindrical in shape and has a gas flow hole 5a. The chest belt 6b is hermetically connected to one end 5b of the tongue. The tongue 5 has another end formed to include an engaging portion 5d having a groove 5c which mates with a pawl (shown at 4f in FIG. 4), described later. The other end of the engaging portion 5d has an inclined surface 5e.

A filter 10 is situated in the gas flow hole 5a of tongue 5 at the end 5b thereof and is retained by a cap, and a tongue cap 11 (shown more clearly in FIG. 6) is provided in the gas flow hole 5a of tongue 5 at the other end thereof. The filter 10 serves to cool the gas which flows into the infant seat belt 6 and to prevent foreign matter from penetrating the infant seat belt 6. As shown in FIG. 5(a), the tank cap 11 is provided with a groove 11a. Under ordinary conditions, the cap 11 hermetically seals the gas flow hole 5a of the tongue 5 and prevents foreign matter from entering the interior of the hole 5a. However, when the gas is generated in the event of an emergency, the cap readily breaks from the groove 11a under the pressure of the gas so that a gas flow passageway is assured.

Since the tongue 5 is formed to be cylindrical and the gas flow hole 5a need not be made very large, the overall tongue can be made compact, thereby enhancing operability with regard to connecting it to and disconnecting it from the buckle device 4.

As shown in FIG. 4, the buckle device 4 has a cylindrical main body 4b provided with a gas flow hole 4a. The arrangement is such that the other end of the tongue 5 can be fitted into the gas flow hole 4a from one end of the buckle main body 4b. The gas generator 9 is fixedly fitted into the other end of the buckle main body 4b. Furthermore, the outer peripheral surface of the buckle main body 4b is formed to have a projection 4c. A groove 4d into which the aforementioned pawl 4f is fittingly engaged is formed in the projection 4c in a direction perpendicular to the axial direction of the buckle. Further, the projection 4c and the buckle main body 4b are formed to have an axially extending groove 4e in which the engaging portion 5d of the tongue 5 is capable of being fitted.

As illustrated in FIGS. 4 and 6, a spring 4g is disposed inside the gas flow hole 4a of the buckle main body 4b. The spring 4g biases the tongue 5, which has been fitted into the gas flow hole 4a, in the disengaging direction. A buckle cap 12 is attached to one end of the spring 4g. The buckle cap 12 is capable of sliding between a position at which the spring 4g is in the free state, which prevails when the tongue 5 has not been fitted into the gas flow hole 4a, and a position at which the cap 12 is urged into abutting contact with a step portion 4h of the gas flow hole 4a owing to insertion of the tongue 5 into the gas flow hole 4a.

The buckle gap 12 is provided with a groove 12a, as shown in FIG. 5(b). Under ordinary conditions, the cap 12 hermetically seals the gas flow hole 4a of the buckle main body 4b and prevents foreign matter from entering the interior of the gas flow hole 4a on the side of the gas generator 9. However, when the gas is generated in the event of an emergency, the cap readily breaks from the groove 12a under the pressure of the gas so that a gas flow passageway is assured.

As illustrated in FIG. 6, the pawl 4f is fitted into the groove 4d. The pawl 4f is constantly biased in a direction which fits it into the groove 4d by a spring 4j comprising a leaf spring. As a result, when the tongue 5 is fitted into the gas flow hole 4a of the buckle main body 4b, the pawl 4f is urged upward against the biasing force of the spring 4j by the inclined surface 5e of the projection 5d on the tongue 5 as the tongue 5 is moved in the axial direction. When the tongue 5 abuts against the step 4h of the gas flow hole 4a via the buckle cap 12, the groove 5c in the projection 5d of tongue 5 registers with the groove 4d of the buckle main body 4b, whereby the pawl 4f is mated with the groove 5c owing to the biasing force of the spring 4j. With the pawl 4f mated with the groove 5c, the tongue 5 is incapable of becoming disconnected from the buckle main body 5b. One end portion of the spring 4j is clamped between an upper cover 4k of the buckle device 5 and the projection 4c.

As shown in FIG. 4, the upper cover 4k is formed to have an opening 4n into which an operating button 4m is fitted, and a portion $4o_1$ of an opening 4o into which the tongue 5 is fitted. The upper cover 4k is formed to have an engaging pawl 4p. The engaging pawl 4p engages with a mating portion (not shown) of a lower cover 4q when the upper cover 4k and the lower 4q are fitted together. As a result, a cover which covers the buckle main body 4b is formed. The lower cover 4q is formed to have another portion $4o_2$ of the opening 4o into which the tongue 5 is fitted. The single circular opening 4o is formed when the upper cover 4k and lower cover 4q are fitted together.

The operating button 4m, which is fitted into the opening 4n of the upper cover 4k so as to be capable of moving back and forth, is constantly biased to project outwardly from the opening 4n by a pair of coil springs 4r compressed between the operating button 4m and the upper cover 4k. In this case, engaging protrusions 4s formed on both sides of the operating button 4m engage with locking portions (not shown) provided on the upper cap 4k at prescribed positions, whereby the amount of projection of the operating button 4m is limited. The position at which the engaging protrusions 4s engage with the locking portions of the upper cap 4k is the position occupied by the operating button 4m when it has not been operated, as indicated by the solid line in FIG. 6.

The left and right sides of the operating button 4m are formed to include a lifting portion 4u, which has an inclined surface 4t, for lifting the pawl 4f. The arrangement is such that the inclined surface 4t of each lifting portion 4u is situated below the pawl 4f when the operating button 4k is moved in the axial direction. When the operating button 4m is pushed inward to the position indicated by the dashed line in a state in which the tongue 5 and buckle device are connected together, as illustrated in FIG. 6, the inclined surface 4t comes into contact with the lower edge of the pawl 4f and lifts the pawl 4f upward as the operating button 4m is moved in the axial direction. As a result, the pawl 4f exits from the grooves 4d, 5c so that the tongue 5 and buckle device 4 disengage.

The infant-restraining protective seat 1 having the inflatable seat belt has its base 3 placed upon a vehicle seat 13, and a seat belt 14 with which the vehicle seat 13 is provided is tightened upon being passed through a mounting hole 15 or a mounting hole 16 formed in the seat main body 2, thereby fixing the restraining protective seat 1 to the vehicle seat 13.

In order to be used, the infant-restraining protective seat 1 having the inflatable seat belt of the embodiment constructed as described above is placed upon vehicle seat 13 and is secured thereto by the vehicle seat be it 14.

Under ordinary conditions the shoulder belts 6a are maintained in a belt-shaped form and the chest belt 6b is maintained in the form of a thin fabric. In addition, when the buckle device 4 and tongue 5 are not engaged, the gas flow hole 4a of the buckle device 4 is shut by the cap 12, and the gas flow hole 5a of the tongue 5 is shut by the cap 11. As a result, foreign matter will not enter the gas generator 9 and the infant seat belt 6.

After the infant sits down in the protective seat 1, the chest-contact pad 7 is grasped and the tongue 5 is inserted into and locked with the buckle device 4, whereby the belt is fastened to restrain the infant. Since the pawl 4f fits into and engages the groove 5c with the belt in the fastened state, the tongue 5 will not slip out of the buckle device 4 and the connection between the tongue 5 and the buckle device 4 will be maintained. With the tongue 5 and the buckle device 4 in the connected state, the gas flow hole 4a and the gas flow hole 5a register with each other to form a single gas flow hole. Under ordinary conditions, however, the gas flow holes 4a and 5a are shut by the caps 11, 12.

When deceleration of a predetermined magnitude acts upon the vehicle while the vehicle is traveling, the infant is reliably restrained by the infant seat belt 6 and chest-contact pad 7 and therefore is protected from moving forward. Thus, the infant-restraining protective seat 1 having the inflatable seat belt of this embodiment exhibits an infant-restraining function similar to that of the conventional infant-restraining protective seat having the seat belt according to the prior art, and the comfort of the conventional infant-restraining protective seat is assured.

In the event of an emergency when a very large deceleration acts upon the vehicle, as when a vehicular collision occurs, a deceleration sensor provided in the vehicle is actuated and causes the gas generator 9 to generate a high-pressure gas. As shown in FIG. 6, the generated gas flows instantaneously into the gas flow hole 4a of the buckle device and collides with the buckle cap 12, whereby the cap breaks. Since this allows a gas flow passageway to form, the gas then collides with the tongue cap 11 so that this cap breaks in similar manner. As a result, the gas flow hole 4a on the side of the buckle device 4 and the gas flow hole 5a on the side of the tongue 5 communicate so that the gas generator 9 is brought into direct communication with the infant seat belt 6 and a gas flow passageway is formed between the gas generator 9 and the infant seat belt 6. Consequently, gas generated by the gas generator 9 flows into the chest belt 6b of the infant seat belt 6 so that the chest belt 6b starts to expands. Owing to the expansion force of the chest belt 6b, the holding portions 7c, 7d of the chest-contact pad 7 break and the folded portions of the infant seat belt 6 become unstuck owing to the pressure of the gas. As a result, the infant seat belt expands substantially instantaneously and reliably in the outward direction. In this case, the infant seat belt does not experience folding. As a result, a sufficiently large gas flow area is assured so that the gas penetrates the interior of the infant seat belt instantaneously and the efficiency of the gas is improved. In addition, any foreign matter such as residue caused by reaction with the gas in the gas generator 9 or fragments caused by breakage of the caps 11, 12 is captured by the filter 10, and therefore such foreign matter will not penetrate into the interior of the infant seat belt 6.

Accordingly, the infant is reliably restrained by the inflated infant seat belt 6. As a result, the infant seat belt 6 broadens so that the kinetic energy of the infant is borne over a wide area. The load therefore is dissipated so that the infant is protected against large impact loads in a reliable manner. In addition, slack in the infant seat belt 6 is taken up owing to its expansion, as a result of which the infant-restraining performance of the belt is improved.

In order to disengage the tongue 5 and the buckle device 4, the operating button 4m is pressed inward, whereby the pawl 4f exits from the grooves 4d, 5c, thereby disengaging the tongue 5 and the buckle device 4. As a result, since the tongue 5 is biased in the direction of disengagement by the spring 4g, the tongue 5 readily separates from the buckle device 4.

Figure 7:
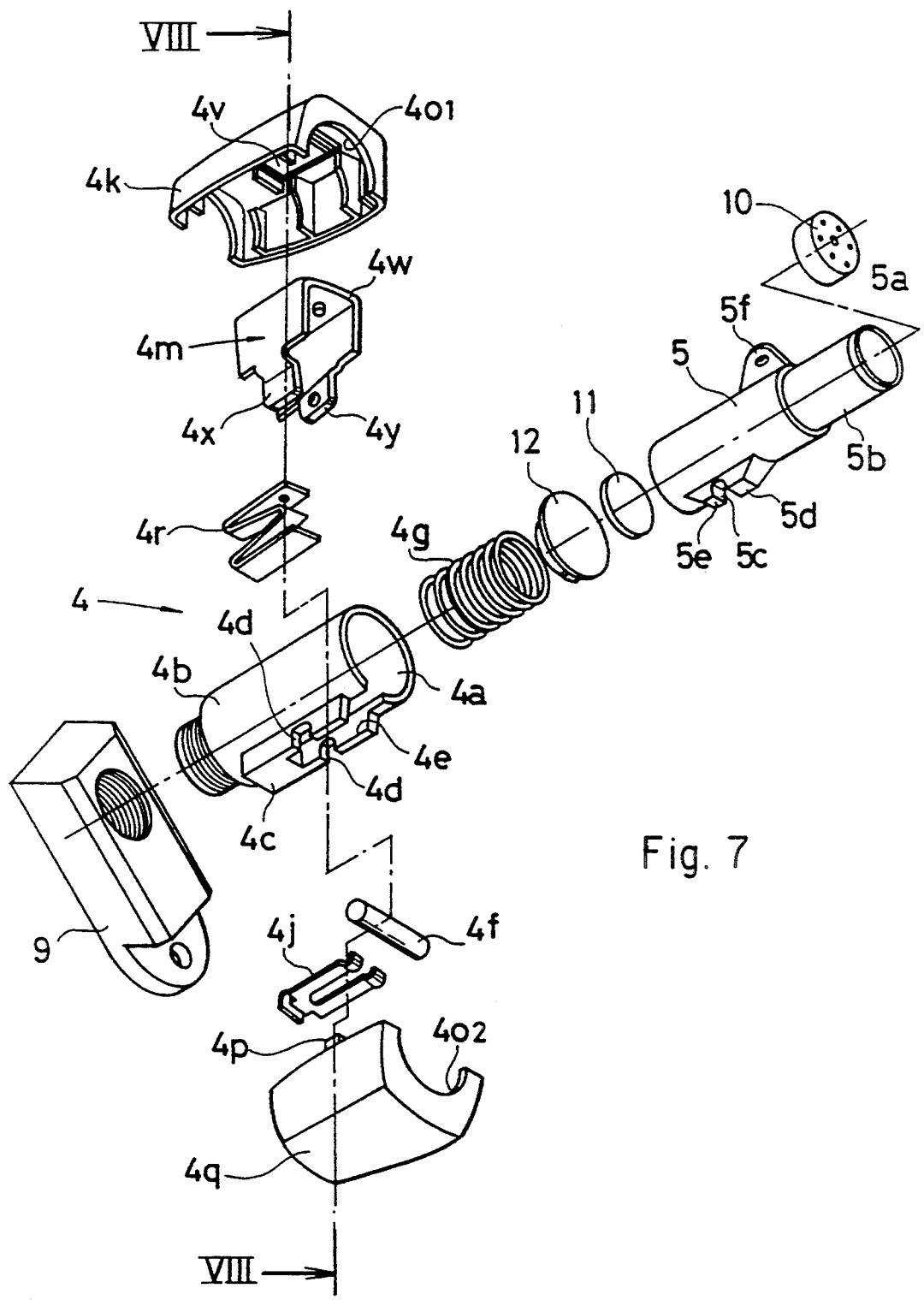
FIG. 7 is an exploded perspective view, similar to that of FIG. 4, showing a tongue and a buckle device according to another embodiment of the present invention.

FIG. 7 is a perspective view, similar to that of FIG. 4, showing another embodiment of the present invention. Elements identical with those of the first embodiment are designated by like reference characters and need not be described again.

Figure 8:
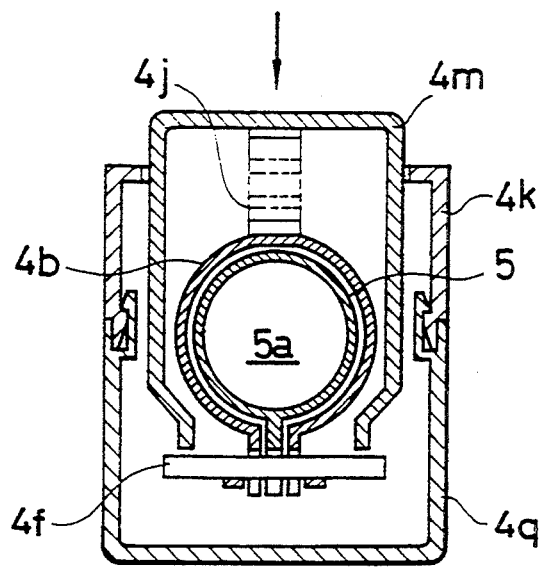
FIG. 8 is a sectional view showing the tongue and buckle device of this embodiment in the connected state.

In the foregoing embodiment, the arrangement is such that the operating button 4m for disengaging the tongue 5 and the buckle device 4 is operated in the axial direction. In this embodiment, however, it is arranged so that the operating button 4m is operated in a direction perpendicular to the axial direction. More specifically, the operating button 4m according to this embodiment has a squarish, inverted generally U-shaped cross section. As clearly shown in FIG. 8, the operating button 4m is urged upwardly at all times by a spring 4r compressed between the operating button 4m and the buckle main body 4b. The button has a crown 4w which projects upwardly through an opening 4v in the upper cover 4k. The operating button 4m is so arranged that the buckle main body 4b fits between the two side walls thereof. The lower edges of the two side walls are formed to have pawl pressing portions 4x, 4y which press the pawl 4f downward when the operating button 4m is pressed downward.

The pawl 4f is urged upwardly at all times by the spring 4j and fits into the groove 4d of the buckle main body 4b. Similarly, when the tongue 5 is fitted into the gas flow hole 4a of the buckle main body 4b by a prescribed amount, the pawl 4f fits into the groove 5c of the tongue 5 under the biasing force of the spring 4j. When the pawl 4f has been fitted into the groove 5c, the tongue 5 and the buckle device 4 cannot separate and the connection between them is maintained, just as in the first embodiment.

By pressing the operating button 4m downward, the pawl pressing portions 4x, 4y of the operating button 4m press the pawl 4f downward so that it is made to exit from the groove 5c. As a result, the tongue 5 and the buckle device 4 can be disconnected from each other.

The other elements of the infant-restraining protective seat 1 of this embodiment, as well as the actions and effects thereof, are identical with those of the first embodiment described earlier and need not be described again.

Figure 9:
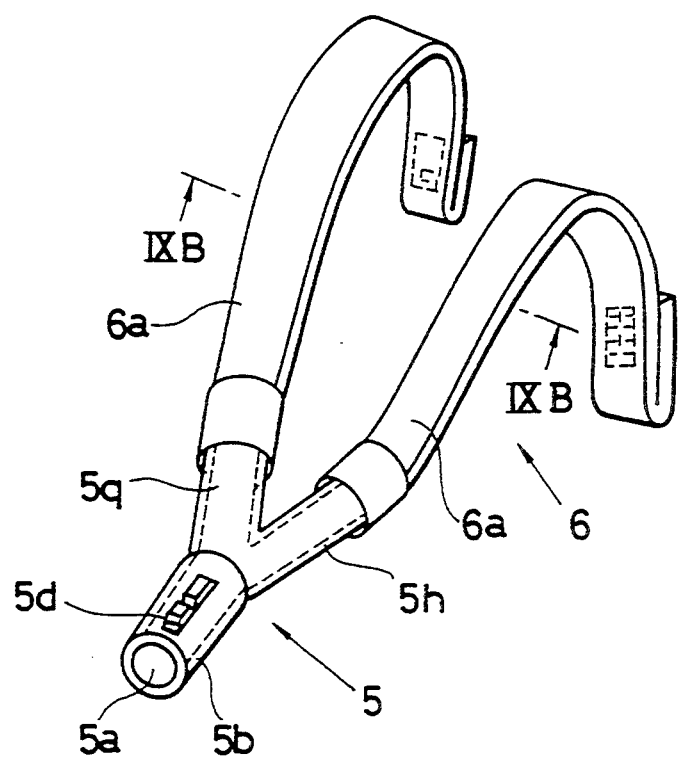
FIG. 9 is a perspective view showing another embodiment of a tongue and an infant seat belt according to the present invention.

FIG. 9, which is a perspective view of the infant seat belt 6 and tongue 5, illustrates another embodiment of the present invention. Elements identical with those of the foregoing embodiment are designated by like reference characters and need not be described again.

In this embodiment, as illustrated in FIG. 9, the tongue 5 is formed in a Y-shaped configuration having two end portions 5g, 5h opposite the end 5h that engages with the buckle device. Similarly, the gas flow hole 5a also is formed into a Y-shaped configuration. The bag-shaped shoulder belts 6a of the infant seat belt 6 are connected to the two ends 5g, 5h of the tongue 5. Accordingly, the gas flow hole 5a of the tongue 5 is brought into communication with the interior of the bag defining the shoulder belts 6a.

The shoulder belts 6a also are folded up and maintained in a belt-shaped form under ordinary conditions and are inflated when the gas is introduced, just as in the first embodiment. The actions and effects of this embodiment also are substantially the same as those of the first embodiment.

In the first embodiment, the gas holes 4a, 5a are formed to have a circular cross section. However, the cross sections of the gas flow holes 4a, 5a may have any desired shape.

Thus, in accordance with the infant-restraining protecting seat having the inflatable seat belt of the present invention, as described in detail above, the infant seat belt is maintained in the form of a belt under ordinary conditions and therefore performs a function similar to that of the conventional protective seat for infants at such time. This makes it possible to maintain the comfort possessed by the conventional protective seat for infants.

When the tongue has been fitted into and engaged with the buckle device, a gas flow passageway communicating the gas generator and the bag-shaped portion of the infant seat belt is formed. In the event of an emergency, therefore, the gas generated by the gas generator can readily penetrate the bag-shaped portion of the infant seat belt through the gas flow passageway without being restricted. This enables the infant seat belt to be inflated instantaneously and in reliable fashion. Accordingly, the portion of the infant seat belt in contact with the infant broadens so that the kinetic energy of the infant can be borne over a wide area. As a result, the load is dissipated and the infant is protected from large impact loads much more reliably.

Furthermore, according to the invention, the gas flow hole in the buckle and the gas flow hole in the tongue are shut by the respective caps. Therefore, even when the tongue and buckle device are not engaged with each other, foreign matter can be prevented from entering the buckle and tongue gas flow holes in reliable fashion. Furthermore, according to the invention, a filter is disposed in the gas flow hole of the tongue. As a result, any foreign matter such as residue caused by reaction with the gas in the gas generating means or fragments caused by breakage of the caps is captured by the filter. Accordingly, foreign matter will not enter the bag-shaped portion of the infant seat belt and therefore the infant seat belt is protected from the influence of such foreign matter.

Furthermore, according to the invention, the infant is restrained by the chest-contact pad of comparatively large area. As a result, protection of the infant is made even more reliable in a manner similar to that of the conventional infant-restraining protective seat.

Furthermore, since the chest-contact pad breaks from the grooves in the event of an emergency, the shoulder belts and the chest belt expand much more quickly and reliably.

As many apparently widely different embodiments of the present invention can be made without departing from the spirit and scope thereof, it is to be understood that the invention is not limited to the specific embodiments thereof except as defined in the appended claims.

What is claimed is:

1. An infant-restraining protective seat, comprising:
   a seat main body;
   an infant seat belt; provided on said seat main body;
   a tongue attached to said infant seat belt, and a buckle device provided on said seat main body into which said tongue is insertable and lockable;,
   gas generating means attached to said buckle device;
   a portion of said infant seat belt being arranged to contact an infant, at least part of said portion of said infant seat belt being formed as a bag-shard portion;
   said bag-shaped portion being maintained in a belt-form under ordinary conditions and inflated by gas from said gas generating means at the time of an emergency;
   said buckle device having a first gas flow hole communicating with said gas generating means, and said tongue having a second gas flow hole communicating with the interior of said bag-shaped portion, wherein when said tongue is inserted into and locked with said buckle device, said first gas flow hole and said second gas flow hole communicate to form a gas flow passageway communicating said gas generating means and said bag-shaped portion of said infant seat belt; and
   wherein said buckle device is provided with a first cap for shutting said first gas flow hole under ordinary conditions and opening said first gas flow hole by breaking at the time of an emergency, and said tongue is provided with a second cap for shutting said second gas flow hole under ordinary conditions and opening said second gas flow hole by breaking at the time of an emergency.

2. The protective seat according to claim 1, wherein said second gas flow hole is provided with a filter for preventing foreign matter from entering said bag-shaped portion of said infant seat belt.

3. An infant-restraining protective seat according to claim 1, wherein a resilient spring is provided in said buckle device for pushing said tongue via said buckle side cap in a direction to withdraw from said buckle device when said tongue is inserted into and engaged with said buckle device.

4. An infant-restraining protective seat according to claim 1, wherein said infant-restraining protective seat is portable and includes means for mounting upon a passenger seat of a vehicle, said gas generating means being within said seat main body of said portable infant-restraining protective seat, and a deceleration sensor is provided which causes said gas generator to release gas when a vehicular collision occurs.

5. An infant-restraining protective seat according to claim 1, wherein said bag-shaped portion of said infant seat belt is narrower at a lower end thereof which connects to said tongue and substantially broadens to a wide chest belt area above said lower end such that kinetic energy of the infant can be borne over a wide area and such that gas generated by the gas generator can readily penetrate the bag-shaped portion without being restricted, and wherein said tongue connects with said buckle at a location on said seat main body such that an infant's legs straddle the gas flow passageway when seated in said infant restraining and protective seat.

6. An infant-restraining protective seat, comprising:
a seat main body;
an infant seat belt provided on said seat main body;
a tongue attached to said infant seat belt, and a buckle device provided on said seat main body into which said tongue is insertable and lockable;
gas generating means attached to said buckle device;
a portion of said infant seat belt being arranged to contact an infant, at least part of said portion of said infant seat belt being formed as a bag-shaped portion;
said bag-shaped portion being maintained in a belt-form under ordinary conditions and inflated by gas from said gas generating means at the time of an emergency:
said buckle device having a first gas flow hole communicating with said gas generating means, and said tongue having a second gas flow hole communicating with the interior of said bag-shaped portion, wherein when said tongue is inserted into and locked with said buckle device, said first gas flow hole and said second gas flow hole communicate to form a gas flow passageway communicating said gas generating means and said bag-shaped portion of said infant seat belt;
wherein said bag-shaped portion of said infant seat belt is narrower at a lower end thereof which connects to said tongue and substantially broadens to a wide chest belt area above said lower end such that kinetic energy of the infant can be borne over a wide area and such that gas generated by the gas generator can readily penetrate the bag-shaped portion without being restricted, and wherein said tongue connects with said buckle at a location on said seat main body such that an infant's legs straddle the gas flow passageway when seated in said infant restraining and protective seat; and
wherein said bag-shaped portion further includes two shoulder belt portions extending upwardly from said chest belt area and spaced sufficiently apart from each other to accommodate an infant's head therebetween.

* * * * *